United States Patent
You et al.

(10) Patent No.: US 7,639,817 B2
(45) Date of Patent: Dec. 29, 2009

(54) METHOD FOR SCRAMBLING PACKET DATA USING VARIABLE SLOT LENGTH AND APPARATUS THEREOF

(75) Inventors: Cheol Woo You, Seoul (KR); Ki Jun Kim, Seoul (KR); Young Woo Yun, Seoul (KR); Soon Yil Kwon, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 1143 days.

(21) Appl. No.: 10/341,746

(22) Filed: Jan. 14, 2003

(65) Prior Publication Data

US 2003/0147422 A1 Aug. 7, 2003

(30) Foreign Application Priority Data

Jan. 30, 2002 (KR) ............................ 10-2002-5389
Feb. 21, 2002 (KR) ............................ 10-2002-10700

(51) Int. Cl.
H04K 1/00 (2006.01)
(52) U.S. Cl. ...................... 380/270; 380/33; 380/272
(58) Field of Classification Search ................. 380/33, 380/270, 272
See application file for complete search history.

(56) References Cited

U.S. PATENT DOCUMENTS

| 4,613,901 | A | * | 9/1986 | Gilhousen et al. | ........... | 380/239 |
| 4,712,238 | A | * | 12/1987 | Gilhousen et al. | ........... | 380/232 |
| 4,792,973 | A | * | 12/1988 | Gilhousen et al. | ........... | 380/231 |
| 5,206,906 | A | * | 4/1993 | McNair | ................... | 380/212 |
| 5,237,610 | A | * | 8/1993 | Gammie et al. | ............. | 380/228 |
| 5,619,247 | A | * | 4/1997 | Russo | ....................... | 725/104 |
| 5,768,276 | A | * | 6/1998 | Diachina et al. | ............ | 370/432 |
| 6,021,311 | A |   | 2/2000 | Gibson et al. | | |
| 6,025,868 | A | * | 2/2000 | Russo | ....................... | 725/104 |
| 6,108,560 | A |   | 8/2000 | Navaro et al. | | |
| 6,442,152 | B1 |  | 8/2002 | Park et al. | | |
| 6,732,366 | B1 | * | 5/2004 | Russo | ....................... | 725/5 |
| 6,813,355 | B1 | * | 11/2004 | Hakaste | .................... | 380/270 |
| 6,882,727 | B1 | * | 4/2005 | Vialen et al. | ................. | 380/33 |
| 7,039,189 | B1 | * | 5/2006 | Kienzle et al. | ............. | 380/239 |
| 2002/0138721 | A1 | | 9/2002 | Kwon et al. | | |

(Continued)

FOREIGN PATENT DOCUMENTS

EP 0522631 A2 1/1993

(Continued)

OTHER PUBLICATIONS

Definition of "scramble" from Webster's II New Riverside Univeristy Dictionary. © 1984, 1988 Houghton Mifflin Company.*

(Continued)

*Primary Examiner*—Kimyen Vu
*Assistant Examiner*—Thomas Gyorfi
(74) *Attorney, Agent, or Firm*—Lee, Hong, Degerman, Kang & Waimey

(57) ABSTRACT

A physical channel transmission method and a transmission chain therefor in a communication system are disclosed. In transmitting packet data or packet control data through a physical channel having a transmission format of variable lengths, the data transmission chain includes a scrambler for scrambling the packet data or packet control data using the transmission format information.

25 Claims, 11 Drawing Sheets

U.S. PATENT DOCUMENTS

| | | |
|---|---|---|
| 2003/0031230 A1 | 2/2003 | Kwon et al. |
| 2003/0096613 A1* | 5/2003 | Das et al. .................. 455/450 |

FOREIGN PATENT DOCUMENTS

| | | |
|---|---|---|
| EP | 0948221 A2 | 10/1999 |
| EP | 1116353 A | 3/2000 |
| EP | 1035667 A2 | 9/2000 |
| EP | 1 298 828 | 4/2003 |
| EP | 1 298 828 A1 | 4/2003 |
| GB | 2 350 037 | 11/2000 |
| GB | 2 350 037 A | 11/2000 |
| JP | 62-111538 | 5/1987 |
| JP | 2000-286856 | 10/2000 |
| JP | 2000-354081 | 12/2000 |
| JP | 2001-268051 | 9/2001 |
| JP | 2004527158 | 9/2004 |
| KR | 1020010015268 A | 2/2001 |
| KR | 1020010112014 A | 12/2001 |
| RU | 2154919 C1 | 8/2000 |
| RU | 2160508 C2 | 12/2000 |
| WO | WO 00/16513 | 3/2000 |
| WO | WO 00/18055 | 3/2000 |
| WO | WO 0054456 | 9/2000 |
| WO | WO 02/07372 A2 | 1/2002 |

OTHER PUBLICATIONS

Definition of "scramble" from American Heritage Dictionary of the English Language, 4$^{th}$ Edition. © 2006 Houghton Mifflin Company. http://dictionary.reference.com/search?q=scramble&x=&y=.*

"NetAction's Guide to Using Encryption Software" © 2001 NetAction. (25 pages) http://www.netaction.org/encrypt/guide.html.*

* cited by examiner

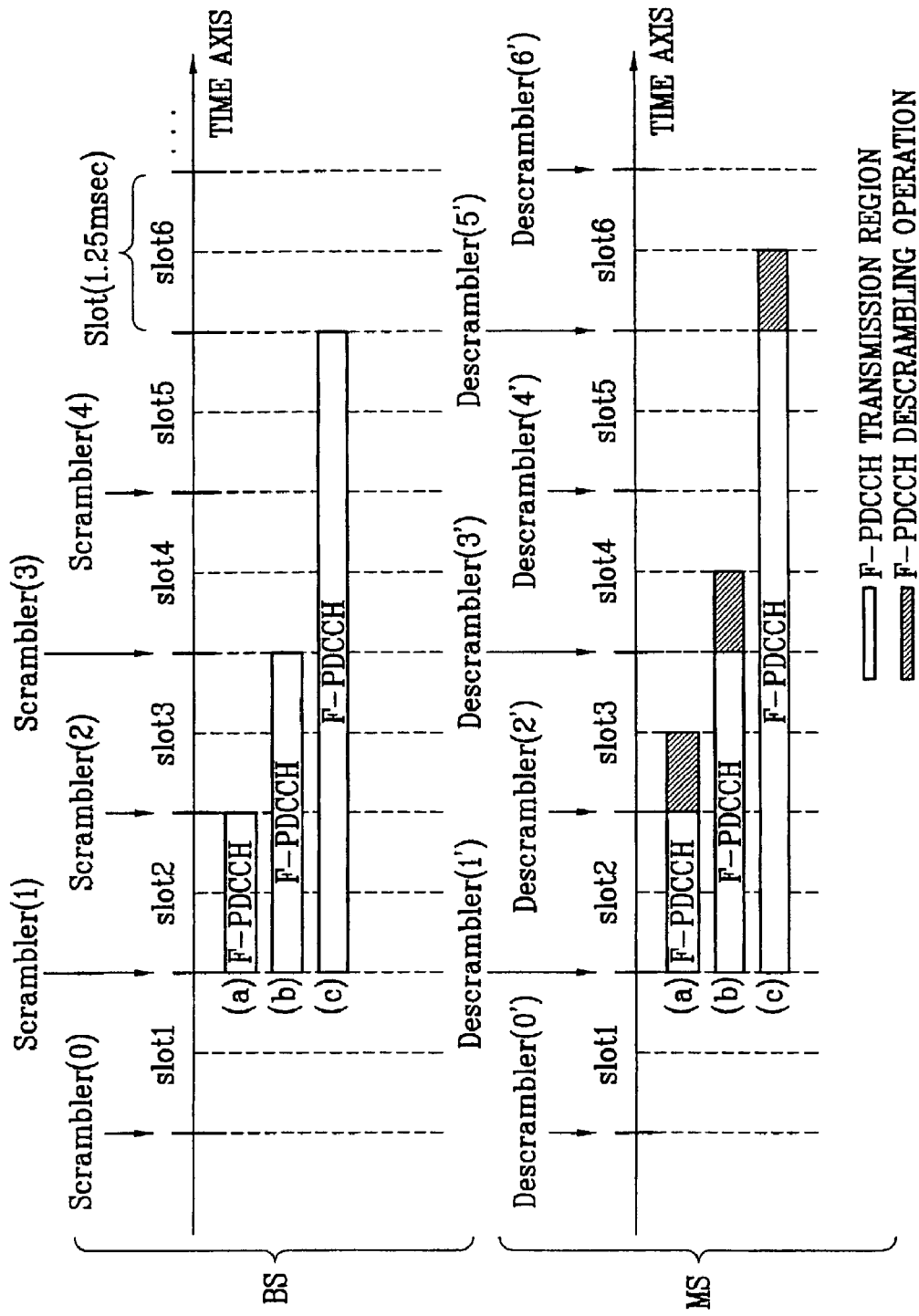

METHOD FOR SCRAMBLING PACKET DATA USING VARIABLE SLOT LENGTH AND APPARATUS THEREOF

CROSS REFERENCE TO RELATED ART

This application claims the benefit of the Korean Application Nos. P2002-05389 filed on Jan. 30, 2002, and P2002-10700 filed on Feb. 21, 2002, which is hereby incorporated by reference.

BACKGROUND OF THE INVENTION

1. Field of the Invention

The present invention relates generally to a wireless communication system, and more particularly, to a data transmission method through a physical channel and a transmission chain therefor.

2. Discussion of the Related Art

In a certain wire/wireless communication system, a transmitter transmits one among various types of transmission formats over a specified physical channel. Nevertheless, if it is required for a receiver to receive the data over the channel without any information on the transmission format, the receiving end performs a blind format detection. As an example of such a system, there is the 1x-EVDV system In the 1x-EVDV system, at least one of a plurality of forward packet data control channels (F-PDCCHs) may be used to transmit control information of a forward packet data channel (F-PDCH) that is a physical channel for transmitting packet data.

Specifically, for the packet data transmission, the conventional wireless communication systems use a physical channel, such as a packet data channel (PDCH), a packet data control channel (PDCCH), etc.

The PDCH is a channel that is used to transmit packet data to a corresponding terminal (or a user, hereinafter referred to as terminal).

The PDCCH contains control information for enabling the corresponding terminal to receive, without error, the packet data being transmitted through the PDCH.

The PDCCH is a forward channel that includes the control information on the PDCH. The receiver extracts the control information from the PDCCH, and decodes the PDCH using the control information.

Generally, the PDCCH is composed of various kinds of information required for decoding of 13~21 bits, cyclic redundancy checking (CRC) bits of 6~8 bits for checking existence/nonexistence of a receiving error of the information, and convolutional encoder tail bits of 8 bits.

The whole information of 27~37 bits as constructed above is produced as coded bits of 54~64 bits (in case of ½-coding) or coded bits of 108~128 bits (in case of ¼-coding) by a convolutional encoder having a ½ or ¼ code rate.

Hereinafter, a conventional method of puncturing the coded bits will be explained with reference to the following drawings.

FIG. 1 is a block diagram of a transmission chain of a general F-PDCCH.

The data (i.e., input sequence) transmitted through a general F-PDCCH is combined with an error detection code, such as a CRC code, through an error detection code addition block 101 which consists of a single CRC generator.

Generally, a medium access control (MAC) identifier (MAC_ID) is the control information included in a service data unit (SDU) transferred from a MAC layer, and indicates an identifier of the terminal to which the corresponding SDU is to be transmitted. The error detection code addition block 101 generates an error detection code.

Tail bits for sending the final state of the encoder as a trellis termination state are added to the bits having the CRC code in a tail bit addition block 102.

The bits to which the tail bits are added is encoded using a convolutional code in an encoder 103.

Through the above-described process, the generated coded bits are repeated through a symbol repetition block 104 to match the length of a transmission slot, and the repeated bits are punctured in a puncturing block 105.

For instance, since the number of usable Walsh codes is limited in the 1x-EVDV system, a Walsh code having a length of 64 chips is used for the PDCCH. Thus, the number of coded bits included in one slot is 48.

The slot length used to transmit the PDCCH is classified into one slot, two slots, and four slots. For example, the 48 coded bits are included in one slot, 96 coded bits are included in two slots, and 192 coded bits are included in four slots.

For instance, as shown in FIG. 1, if 8-bit CRC bits and 8-bit encoder tail bits are added to the 18-bit information bits, and a channel code having a ½ code rate is used for the transmission of one slot, 68 coded bits are generated. Then, the generated coded bits are punctured through the puncturing block 105 to match the length of the transmission slot.

Since one slot is for transmitting 48 coded bits, the puncturing of 20 (i.e., 68−48=20) bits is performed, and then 48 coded bits are transmitted through the one slot.

At this time, if the same amount of information is transmitted through four slots, the corresponding information bits, as shown in FIG. 1, are generated as 136 coded bits through an encoder having a ¼ code rate, and then generated as 272 bits through a symbol repetition block. Since these 272 bits should be transmitted through four slots, i.e., 192 bits, 80 (=272−192) bits are punctured. These 192 bits are transmitted, being equally divided into four slots.

The punctured bits are interleaved through a block interleaver 106, and then modulated by a modulator 107 in accordance with a QPSK method. The modulated signal is divided into an I-channel signal and a Q-channel signal using a portion of Walsh codes.

As described above, the transmission length of the F-PDCCH may be one slot, two slots, or four slots. Here, the slot means a time unit of 1.25 msec. At this time, the transmitter does not inform the length of the F-PDCCH currently being transmitted to the receiver. In other words, the receiver does not accurately know what format is being received. Accordingly, the receiver performs the decoding process with respect to three formats (i.e., three lengths of one slot, two slots, and four slots) and checks the CRC to detect what is the transmission length (or format) of the received F-PDCCH.

As described above, in case that the receiver determines the format of the transmission channel only using the CRC, a case that the CRC has the same value of '1' (which corresponds to the case that an accurate transmission format is detected) may occur with respect to two or more kinds of formats. In this case, the receiver cannot accurately determine what kind of transmission format is transmitted through the channel. Accordingly, an additional device for minimizing the occurrence of such a case is required.

SUMMARY OF THE INVENTION

Accordingly, the present invention is directed to a data transmission method through a physical channel and a transmission chain therefor that substantially obviates one or more problems due to limitations and disadvantages of the related art.

An object of the present invention is to provide a data transmission method and a transmission chain therefor that enables a receiver to accurately determine a transmission format by scrambling according to transmission format information through a transmitter.

Another object of the present invention is to provide a data transmitting method and a transmission chain therefor that can reduce the load of a receiver by descrambling.

In another aspect of the present invention, a data transmitting/receiving method includes scrambling data to be transmitted using the length of the transmission format on a physical channel having the transmission format of the variable length, transmitting the scrambled data to a receiving end, and descrambling the transmitted data without detecting the information on the transmission format from the received data, wherein the scrambling code at a time point of the scrambling is equal to the descrambling code at a time point of the descrambling after the predetermined number of slots.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a data transmission chain in transmitting certain data through a physical channel having a transmission format of a variable length, the data transmission chain comprises a scrambler for scrambling the certain data using a scrambling code including information on the transmission format.

In another aspect of the present invention, A communication system comprises a transmitter including a scrambler for scrambling a signal to be transmitted using a mask code that includes information on a transmission format of a variable length on a physical channel having the transmission format of the variable length, and a receiver including a descrambler for descrambling a signal received from the transmitter using a specified mask code without detecting the information on the transmission format from the received signal, wherein an output when the scrambler operates is equal to that when the descrambler operates.

In another aspect of the present invention, a data transmitting/receiving method includes scrambling data to be transmitted using a mask code that includes information on a transmission format of a variable length on a physical channel having the transmission format of the variable length, transmitting the scrambled data to a receiving end, and descrambling the transmitted data using a specified mask code without detecting the information on the transmission format from the received data, wherein the scrambling code at a time point of the scrambling is equal to the descrambling code at a time point of the descrambling after a predetermined number of slots.

According to one embodiment of the present invention, a wireless communication method comprising the steps of: scrambling in a scrambler the packet control data with a scrambling sequence, wherein the scrambling sequence is generated in response to a slot length; and transmitting the scrambled packet control data to a receiver. A descrambler of the receiver descrambles the packet control data using a common descrambling sequence that is independent of the slot length. Preferably, the scrambling sequence is generated in response to the slot length and a system time in slot units. Also, the scrambling sequence may be generated in response to different long code masks based on the slot length. Preferably, the slot length comprises one of one, two and four slots.

According to one aspect of the present invention, the method further comprises the steps of adding an error detection code to the packet control data; adding tail bits to the packet control data having the error detection code; encoding the packet control data with the tail bits added thereto; performing at least one of symbol repetition and puncturing the coded packet control data to match a length of a transmission slot; interleaving the symbol-repeated or punctured data; and modulating the interleaved data, wherein the step of scrambling is performed after any one of the above steps.

According to another embodiment of the present invention, a communication channel capable of transferring packet control data having variable slot lengths, comprising the steps of: receiving a scrambled packet control data, wherein the packet control data is scrambled with a scrambling sequence that is generated in response to a slot length; and descrambling the scrambled packet control data by using a descrambling sequence. Preferably, the scrambling sequence is generated based on the slot length and a transmission time. The descrambling sequence is generated based on a receiving time.

According to another embodiment of the present invention, a wireless communication system comprises a scrambler for scrambling the packet control data with a scrambling sequence, wherein the scrambling sequence is generated in response to a slot length; and a transmitter portion for transmitting the scrambled packet control data to a receiver. The system further comprises a descrambler for descrambling the packet control data using a common descrambling sequence that is independent of the slot length.

According to an embodiment of the present invention, a wireless communication method using communication channels capable of transferring packet control data having variable slot lengths, comprises the steps of: scrambling the packet control data with at least one of a plurality of long code masks in a transmitting device, wherein the packet control data having different slot lengths and being substantially parallely transmitted are scrambled with scrambling codes generated using different code masks; communicating the scrambled packet control data to a receiving device; and descrambling the packet control data in the receiving device using a common long code mask that is used to generate descramble codes corresponding to the plurality of code masks used in the transmitting device.

According to one aspect of the invention, in the transmitting device a first packet control data having a first slot length is scrambled with a first code mask and a second packet control data having a second slot length is scrambled with a second code mask. Preferably, in the receiving device the first and the second packet control data are descrambled using the common code mask that is used to generate the first and the second code masks in response to a difference in transmission and reception time.

According to another aspect of the invention, the wireless communication method further comprising the steps of: adding an error detection code to the packet control data; adding tail bits to the packet control data to which the error detection code is added; encoding the packet control data to which the tail bits are added; performing a symbol repetition and/or puncturing the coded packet control data to match a length of a transmission slot; interleaving the symbol-repeated and/or punctured data; and modulating the interleaved data, wherein the step of scrambling is performed after any one of the above steps. The step of adding the error detection code comprises the steps of: adding a first error detection code to the packet control data using a medium access control identifier (MAC ID) provided as an identifier of the receiving end to which the packet control data is to be transmitted; and generating a second error detection code using the packet control data to which the first error detection code is added, wherein the packet control data to which the first error detection code is added is scrambled.

According to another aspect of the invention, the plurality of code mask is determined so that a scrambling code mask at a time point when the packet control data is scrambled is equal to a descrambling code used at a time point when the receiving end descrambles the transmitted packet control data. With respect to a slot length N for transmitting the packet control data and a predetermined constant $\Delta$, a descrambling code generated from the common code mask comprises the code after $N+\Delta$ from a time point when the data is scrambled.

According to another aspect of the invention, the information used generated the scrambling code and descrambling code includes at least one of a system time and the number of slots. According to another embodiment, a wireless communication system using communication channels capable of transferring packet control data having variable slot lengths, comprises: a scrambler comprising a system timer, a calculator connected to the system timer, wherein the calculator calculates a value using the system timer output and/or the number of slots, wherein the scrambler generates the scrambler code using the value According to another embodiment, a wireless communication system using communication channels capable of transferring packet control data having variable slot lengths, comprises: a scrambler comprising a long code generator operable in response to a plurality of code masks to generate long codes; a bit extractor operably connected to the long code generator; a first shift register operably connected to the bit extractor; a switch operably connected to the first shift register to control an output signal of the first shift register; a second shift register operably connected to the switch, wherein the scrambler scrambles the packet control data using at least one of the plurality of code masks in a transmitting device, wherein the packet control data having different slot lengths and being substantially parallely transmitted are scrambled with scrambling codes generated using different code masks.

According to another embodiment, a mobile terminal uses the scrambling technique described herein. The mobile terminal is for use with a wireless transmission system using communication channels capable of transferring packet control data having variable slot lengths, the communication system comprising a scrambler for scrambling the packet data with at least one of the plurality of code masks, wherein the packet control data having different slot lengths and being substantially parallely transmitted are scrambled with scrambling codes generated using different code masks. The mobile terminal comprises a descrambler that descrambles the scrambled packet data using a common code mask that is used to generate the plurality of code masks used in the transmission system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 10A to 10D illustrate scrambling and descrambling of a transmitting end and a receiving end according to a second embodiment of the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
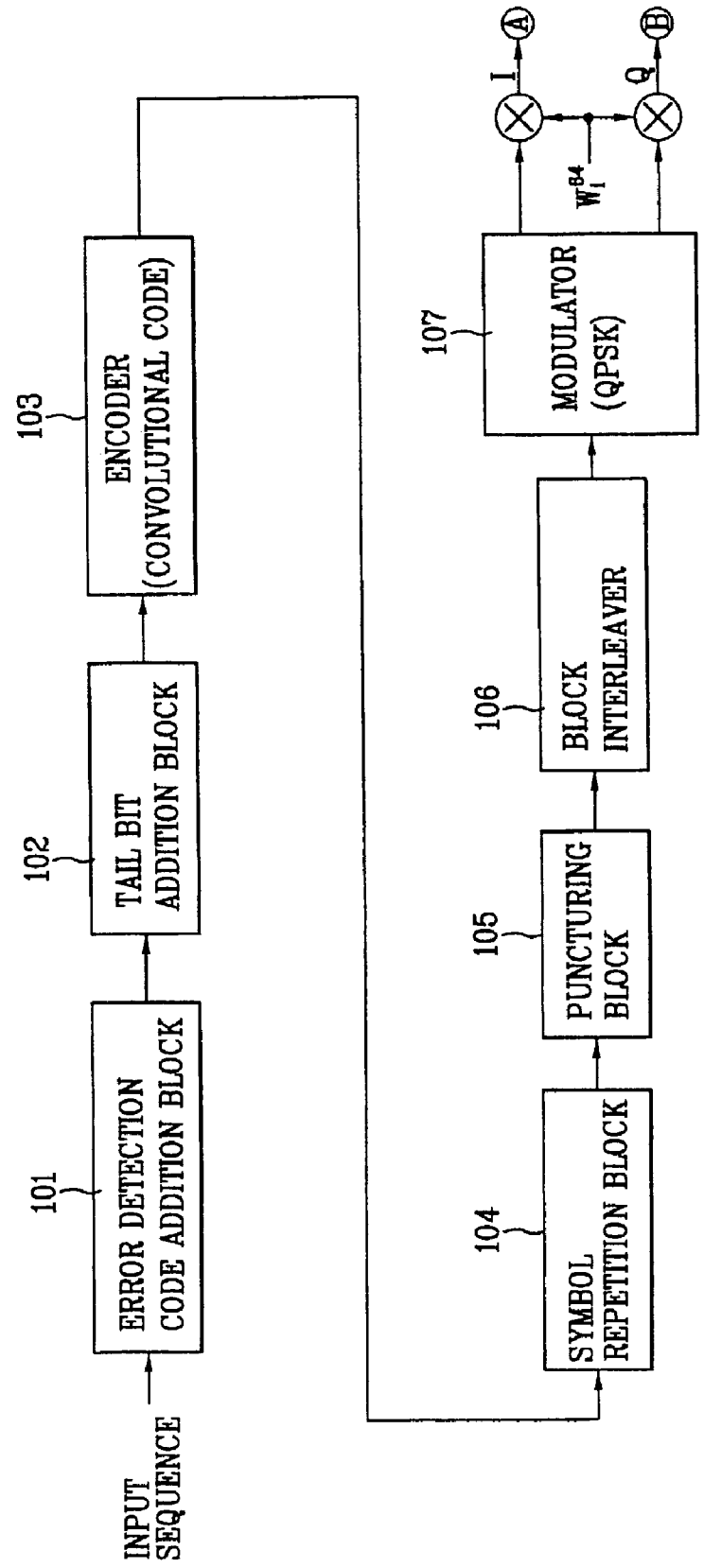
FIG. 1 is a block diagram of a transmission chain of a general F-PDCCH.
Figure 2:
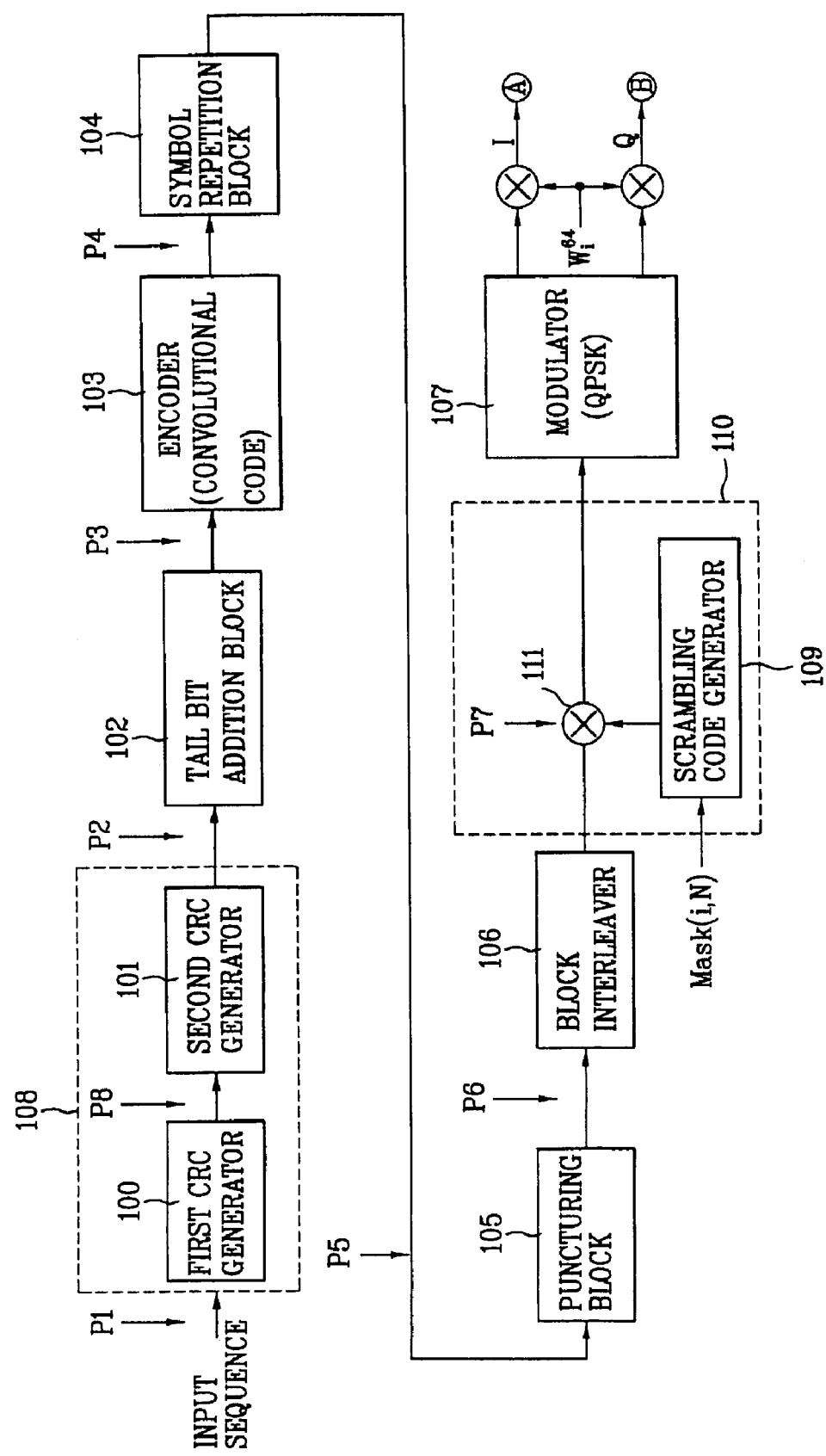
FIG. 2 is a block diagram of a transmission chain of an F-PDCCH according to an embodiment of the present invention.

FIG. 2 is a block diagram of a transmission chain of an F-PDCCH according to an embodiment of the present invention.

In particular, FIG. 2 shows the transmission chain of the F-PDCCH used for transmission of control information of an F-PDCH that is a physical channel for transmitting packet data (such as packet control data) in, for example, the 1x-EVDV system.

It is assumed that the system uses two F-PDCCHs, and they are called F-PDCCH(0) and F-PDCCH(1). Also, it is assumed that the transmission formats of each F-PDCCH(i) are classified into N in accordance with the transmission lengths of one slot, two slots, and four slots. The formats are preferably called FM(i,N). For example, in FM(i,N), i=0,1 represents F-PDCCH(0) and F-PDCCH(1), respectively, and N=1,2,4 represents one slot, two slots, and four slots, respectively.

The above description is for illustrating the preferred embodiment of the present invention, and may also be applicable to other systems that have different number of channels or formats.

The construction of the F-PDCCH transmission chain is illustrated in FIG. 2. A scrambler 110 for enabling the receiver to perform a blind format detection with respect to the F-PDCCH without error is additionally provided, and is driven by applying the type of channel and the transmission format information according to a predetermined rule. By specifying the transmission format information as shown in Table 1, the receiver can accurately detect the transmission format with its load reduced.

The scrambler 110 is a device that relatively randomly or pursuant to specific rule generates '0' and '1'. The scrambler 110 may be placed at any one of the following locations: P1, P2, P3, P4, P5, P6, P7, and P8.

FIG. 2 shows the case that the scrambler 110 is added to a location designated as P7.

In FIG. 2, Mask(i,N) is a sequence that is in a one-to-one corresponding relation with FM(i,N), and serves to generate the scrambler 110 output differently in accordance with the kind of channel and/or the transmission format.

Figure 3:
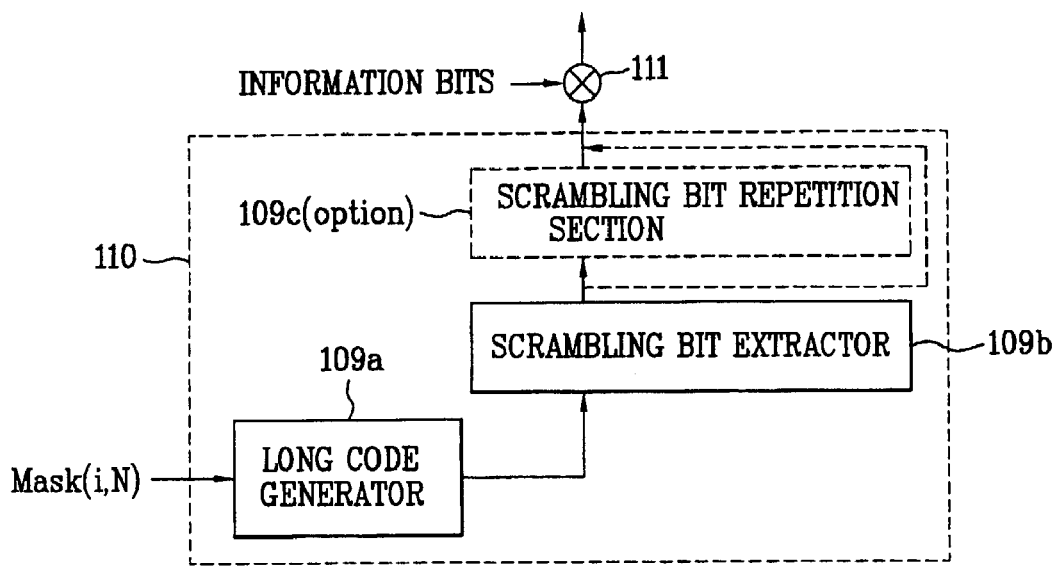
FIG. 3 illustrates the construction of a first embodiment of a scrambler illustrated in FIG. 2.
Figure 4:
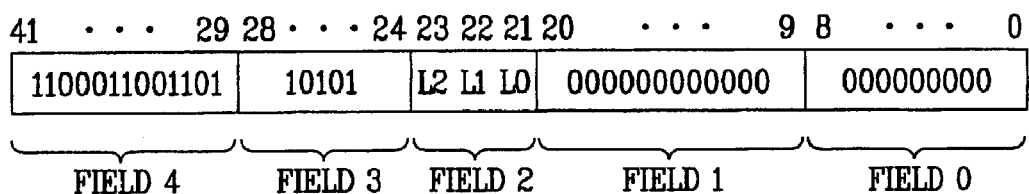
FIG. 4 illustrates a scrambling format insertion state for a long code according to an embodiment of the present invention.

FIG. 3 illustrates the construction of a first embodiment of a scrambler illustrated in FIG. 2. FIG. 4 illustrates an example of a mask insertion with respect to transmission format information in a long code mask in case of using the scrambler illustrated in FIG. 2.

In FIG. 3, in order to implement the scrambler 110 illustrated in FIG. 2, a long code generator used in the existing code division multiple access (CDMA) system may be employed.

The long code generator 109a as shown in FIG. 3 generates the bits outputted with a high-speed chip rate, and a scrambling bit extractor 109b extracts necessary bits from the bits outputted at a high speed from the long code generator 109a. A scrambling bit repetition section 109C is optionally added, and repeats the output of the scrambling bit extractor 109b as needed. A srambling code application section 111 applies the scrambling code to information bits.

At this time, Mask(i,N) may be in the one-to-one corresponding relation with FM(i,N), and has the same operation principle as the existing long code mask.

FIG. 4 shows an example of Mask(i,N) when the degree of a polynomial that prescribes the characteristic of the long code generator 109a illustrated in FIG. 3 is 42. In Mask(i,N), the field 0, field 1, field 3, and field 4 are fixed to specified numerals that are distinguishable from other channels used in the system. The field 2 is predetermined value according to FM(i,N).

In Table 1, several examples of the long code mask to be inserted into field 2 of FIG. 4 according to the kind of transmission format are presented.

this case, Mask(i,N) may be in the one-to-one corresponding relation with FM(i,N). Using this value, the memory value of the shift register is initialized.

Figure 5:
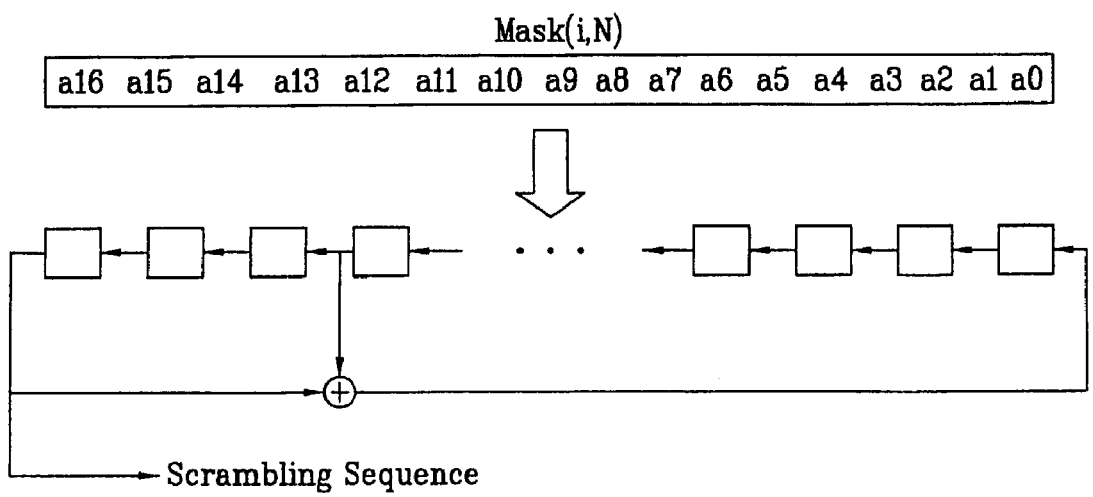
FIG. 5 illustrates the construction of a second embodiment of a scrambler illustrated in FIG. 2.

One example of Mask(i,N) related to FIG. 5 can be represented by $$\text{Mask}(i,N)=(1\ 1\ 1\ 1\ 1\ 1\ 1\ 1\ 1\ 1\ 1\ 1\ 1\ 1\ L2\ L1\ L0) \quad [\text{Eq.1}]$$

Here, as an example of the values of (L2 L1 L0) in the equation 1, values in Table 1 may be used.

As another example of Mask(i,N), time information can be added to Mask(i,N) as follows.

$$\text{Mask}(i,N)=(1\ 1\ 1\ 1\ 1\ 1\ 1\ 1\ 1\ 1\ 1\ 1\ T1\ T0\ L2\ L1\ L0) \quad [\text{Eq.2}]$$

Here, as an example of the values of (L2 L1 L0) in the equation 2, the values in Table 1 may be used. Also, (T1 T0) in the equation 2 is a sequence according to the present transmission time or system time in slot unit. As an example, it is assumed that the transmission timing of the present transmission slot is Slot(t), and the value of Slot(t) is one among {0, 1, 2, . . . 14, 15}.

At this time, if it is determined that Val=(Slot(t) % 4), Val has one value among {0, 1, 2, 3}, and the relationship between T1, T0 and Val can be defined as in Table 2.

TABLE 2

| Val    | 0  | 1  | 2  | 3  |
|--------|----|----|----|----|
| T1 T0  | 00 | 01 | 10 | 11 |

Figure 6:
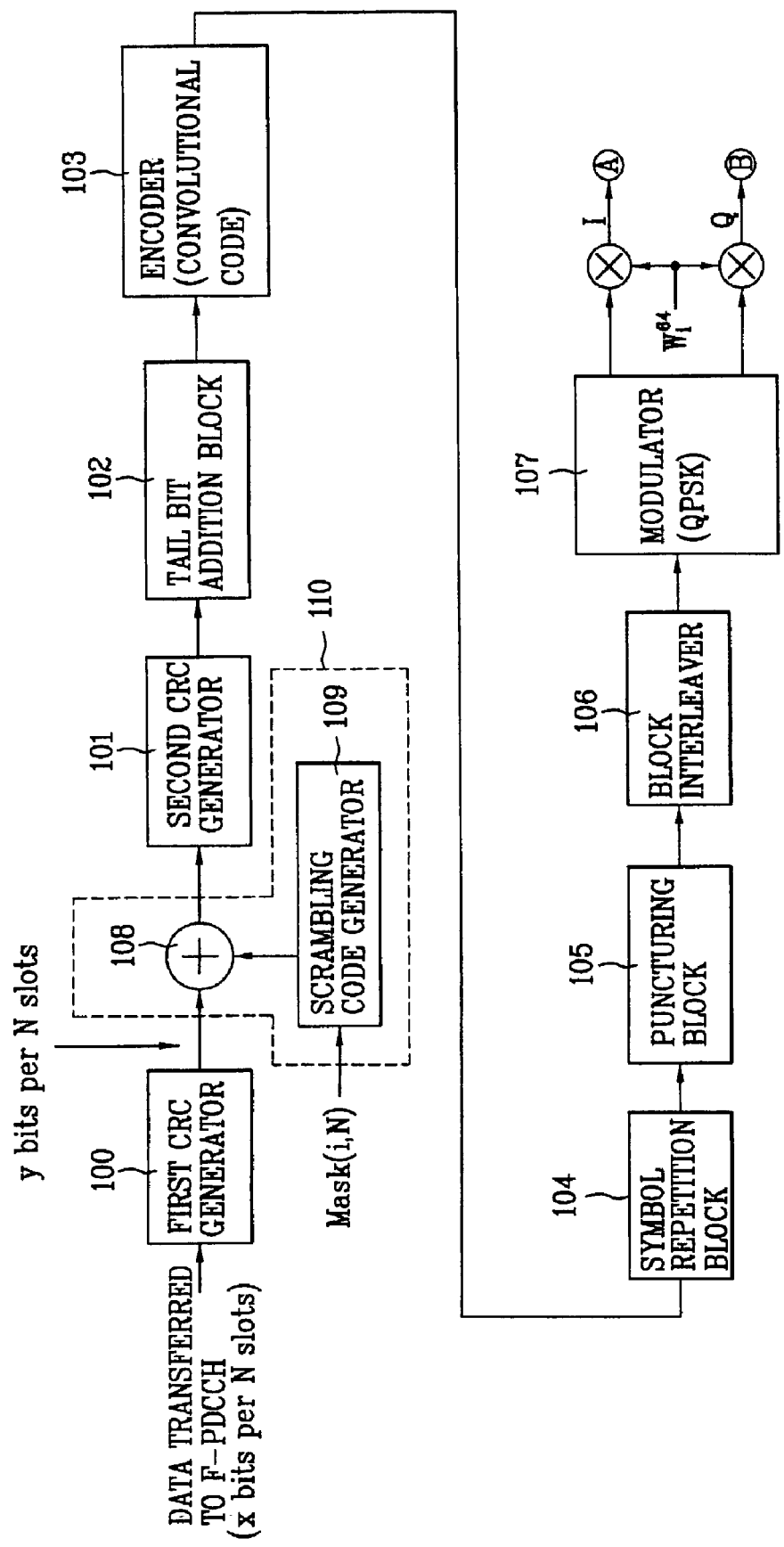
FIG. 6 is a block diagram of a transmission chain of an F-PDCCH according to a second embodiment of the present invention.
Figure 7:
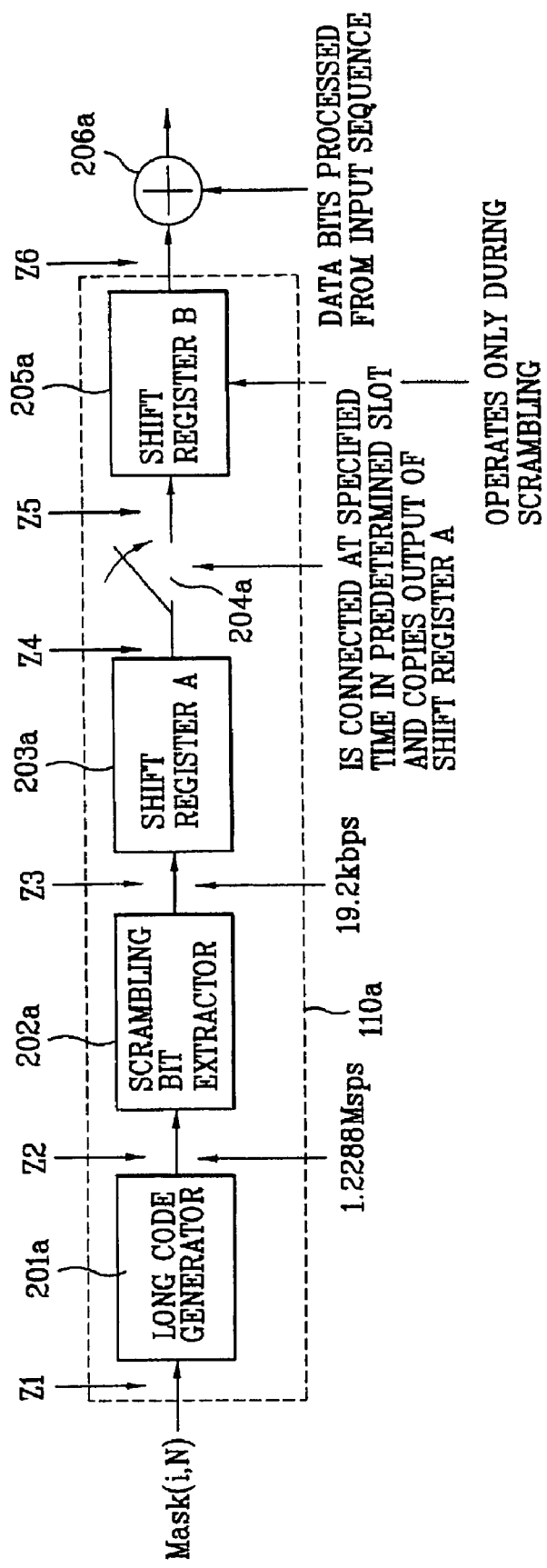
FIG. 7 is a block diagram of a scrambler illustrated in FIG. 6.
Figure 8:
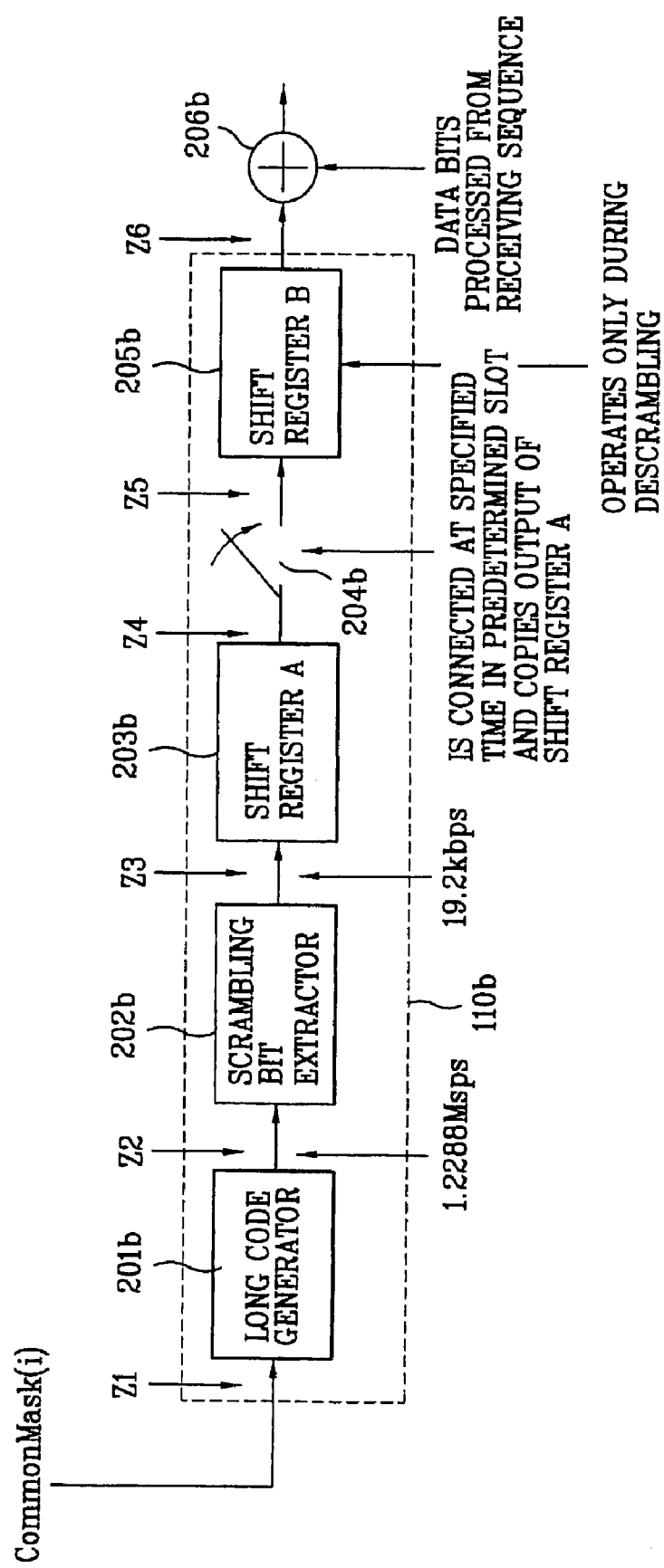
FIG. 8 illustrates the construction of a descrambler for descrambling the scrambler illustrated in FIG. 6.

FIG. 6 is a block diagram of a transmission chain of an F-PDCCH according to a second embodiment of the present invention. FIG. 7 is a block diagram of a scrambler illustrated in FIG. 6. FIG. 8 illustrates the construction of a descrambler for descrambling the data scrambled by the scrambler illustrated in FIG. 6.

In the same manner as the first embodiment, without increasing the hardware complexity, the present invention is additionally provided with a scrambler 110a for the effective transmission/reception of the F-PDCCH, and drives the scrambler 110a based on the specified rule to be explained hereinafter.

The proposed specified rule is related to the generation of output bits of the scrambler 110a in consideration of the transmission/reception time difference of the F-PDCCH between the transmitter (for example, a base station) and the receiver (for example, a mobile station) in accordance with FM(i,N) of the F-PDCCH currently being transmitted/received.

TABLE 1

|          | FM(0,1) | FM(0,2) | FM(0,4) | FM(1,1) | FM(1,2) | FM(1,4) |                |
|----------|---------|---------|---------|---------|---------|---------|----------------|
| L2 L1 L0 | 000     | 001     | 010     | 100     | 101     | 110     | first example  |
|          | 000     | 001     | 010     | 011     | 100     | 101     | second example |
|          | 000     | 001     | 010     | 000     | 001     | 010     | third example  |
|          | 001     | 010     | 100     | 001     | 010     | 100     | 4th example    |

FIG. 5 is a view illustrating the construction of a second embodiment of the scrambler illustrated in FIG. 2.

In order to implement the scrambler illustrated in FIG. 2, a shift register may be employed. Specifically, FIG. 5 shows the embodiment in that the polynomial that prescribes the characteristic of the long code generator is $h(D)=D^{17}+D^{14}+1$. In FIG. 7 shows an example of the scrambler illustrated in FIG. 6 from the viewpoint of the transmitter in the base station (BS).

As described above, a long code generator 201a generates the output bits with a high-speed chip rate (i.e., 1228800 output symbols per sec).

A scrambling bit extractor 202a extracts with a desired rate the bits outputted at a high speed from the long code generator 201a, for example, at a speed of 19.2 kbps.

Mask(i,N), that is the long code mask in this example, is in a one-to-one corresponding relation with FM(i,N), and operates in the same manner as the existing long code mask. A switch 204a between Z4 and Z5 is used to copy an output of a 21-bit shift register A 203a into a 21-bit shift register B 205a at a specified time point predetermined between the BS and the MS (mobile station) in one slot. Also, the 21-bit shift register B 205a generates its output only during the scrambling operation, and a first scrambling code application section 206a performs an XOR operation with respect to an output of the register B 205a and data bits processed from an input sequence, for example, a 21-bt output of a first CRC generator (i.e., inner CRC) 100.

Preferably, the scrambling sequence generated using information pertaining to system time and/or number of slots. Mask(i,N) is related to system time and/or number of slots The system time is preferably the system time in 1.25 MS slots. The scrambler sequence is preferably equal to a predetermined (for example 13) least significant bits of the system time+number of slots, where the system time is in units of the first slot of the packet data control channel transmission.

FIG. 8 illustrates the construction of a descrambler from the viewpoint of the receiver in the MS when used in conjunction with the scrambler shown in FIGS. 6 and 7.

In FIG. 8, the operations of the respective parts coincide with those of FIG. 7. However, the used long code mask is not Mask(i,N), but is CommonMask(i) as described above. On the other hands, a second scrambling code application section 206b performs an XOR operation with respect to an output of the register B 205b and data bits processed from a receiving sequence, wherein the data bits vary dependent on a position of a scrambler 110 in the transmitter of the base station (BS).

As described above, Mask(i,N) in FIG. 7 and CommonMask(i) in FIG. 8 are designed to be mutually related to each other, and at this time, it is assumed that the output of the long code generators 201a and 201b used in the BS and the MS are synchronized in time with each other.

Figure 9:
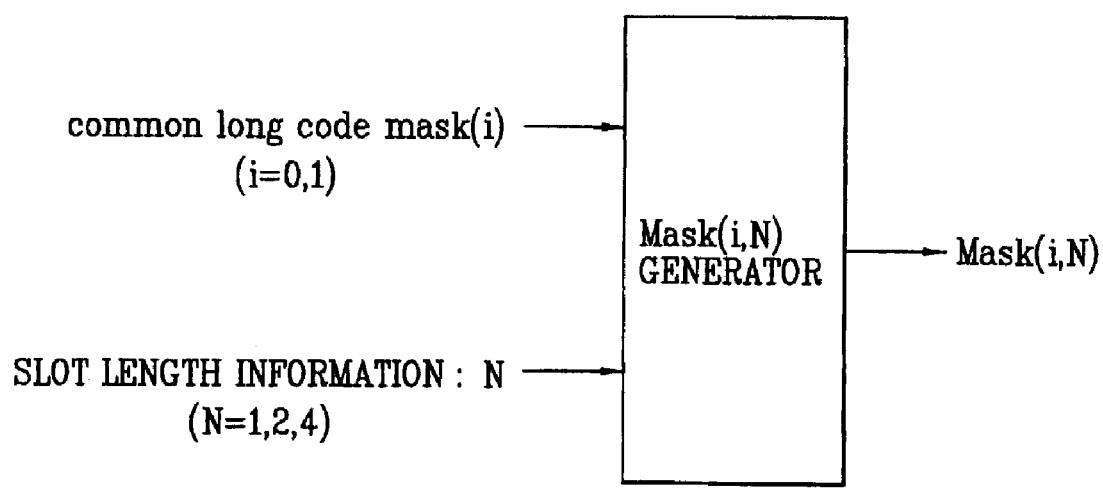
FIG. 9 illustrates the operation of a mask according to the present invention.

FIG. 9 illustrates an exemplary relationship between the scrambler and the descrambler illustrated in FIGS. 7 and 8. When the system is initially designed, Mask(i,N) is determined using CommonMask(i) and the slot length information N.

Preferably, CommonMask(i) is defined not to overlap other long code masks used by other transmission channels of the designed system. At this time, CommonMask(i) may have the different value or the same value according to the value of i. Herein, the i means a priority order of the transmission channel In case that the BS uses Mask(i,N) as the long code mask, Mask(i,N) is designed so as to make the output of the second register (at this time, it is assumed that the receiver uses CommonMask(i)) to be generated after a (N+Δ) slot time from the present time point be generated at the present time point.

Preferably, if the transmitter in the BS uses Mask(i,N) as the long code mask designed as described above, the receiver in MS can perform the descrambling using CommonMask(i) after the (N+Δ) slot time. At this time, α is a certain fixed constant which takes into consideration the hardware related delay. For example, the Δ is one of 0,0.5 and 1.

In other words, the scrambler in the transmitter is designed by alleviating the processing complexity at the descrambler in mobile station.

As described above, the present invention can be applied irrespective of the number of input bits of the F-PDCCH for scrambling.

FIGS. 10A to 10D illustrate scrambling and descrambling of the transmitter and the receiver according to an embodiment of the present invention.

In FIG. 10A, it is assumed that no transmission delay occurs between the transmitter and receiver.

Referring to FIG. 10A, a scrambler(x) means an 21-bit output of a second register 205a used by the BS to scramble a 21-bit output of the first CRC generator (i.e., inner CRC) 100 at the corresponding time point.

In the same manner, a descrambler(x') means a 21-bit output of a second register 205b used by the MS to descramble at the corresponding time point. Herein, the output bits of the scrambler(x) may be varied by the position of the scrambler on the transmission chain For instance, the output bits of the second register 205a used by the BS to transmit (a), (b), and (c) F-PDCCHs at the start point of the slot 2 are the scrambler(1). Also, the output bits of the second register 205b used by the MS to descramble the F-PDCCH indicated as (a) are the descrambler(2').

As described above, if the BS and the MS drive the scrambler and the descrambler according to the same operational principle, in other words, if it is determined that scrambler(x) =descrambler(x'), the output bits of the second registers 205a and 205b used to scramble and descramble the same F-PDCCH are different from each other. As a result, a receiver (such as a mobile terminal) cannot descramble the packet data.

For example, the output bits of the second register 205a used by the BS to scramble the F-PDCCH indicated as (a) are the scrambler(1), and the output bits of the second register 205b used by the MS to descramble the F-PDCCH indicated as (a) are the descrambler(2'). If the BS and the MS drive the scrambler and the descrambler according to the rule which is scrambler(x)=descrambler(x') Generally , the relation of scrambler(1)=descrambler(2') is not established. So the descrambling of MS is not operated correctly.

At this time, the effects achieved by the present invention are as follows.

The scrambler/descrambler of the BS and the MS are driven according to the different rules, and the output bits of the second registers 205a and 205b used during the scrambling and the descrambling of the same F-PDCCH become the same.

As one method for this, they may be driven so that the output of the second register 205a of the BS becomes different according to FM(i,N) of the F-PDCCH to be currently transmitted.

This method will be explained with reference to FIG. 10A.

In case that the BS transmits the F-PDCCH indicated as (a), it drives its own scrambler so that the scrambler(1) has the same output value as the descrambler(2').

In case that the BS transmits the F-PDCCH indicated as (b), it drives its own scrambler so that the scrambler(1) has the same output value as the descrambler(3').

In case that the BS transmits the F-PDCCH indicated as (c), it drives its own scrambler so that the scrambler(1) has the same output value as the descrambler(5').

Figure 10B:
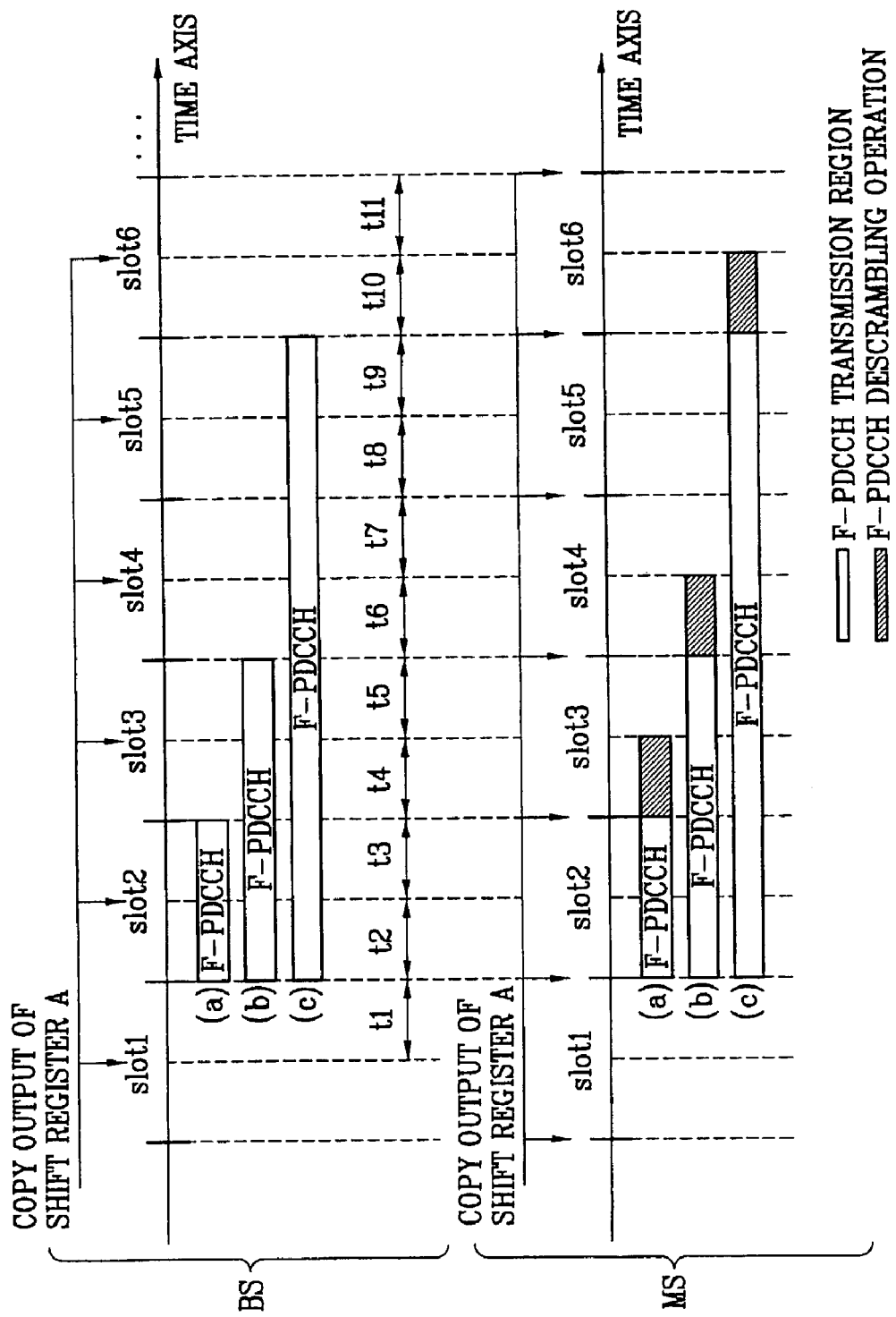

FIG. 10B exemplifies the case that a switch 204a between Z4 and Z5 of the BS is used to copy the output of the 21-bit shift register 203a into the 21-bit shift register 205a at a center time point in one slot. For purpose of illustration, it is assumed that Δ is '0', and no transmission delay occurs between the BS and the MS.

First, if the BS transmits the F-PDCCH having a transmission length of one, two, or four slots in the slot2 region to the MS, the one or more slots are scrambled using the output of the shift register B 205a of the t1 time period.

In the same manner, if the BS transmits the F-PDCCH having a transmission length of one, two, or four slots in the slot5 region to the MS, the one or more slots are scrambled using the output of the shift register B 205a of the t7 time period. The long code mask used at this time is Mask(i,N).

The MS uses the same output of the shift register B 205a of the t3 time period to descramble the F-PDCCH having a length of one slot received in the time period of the slot2.

Also, the MS uses the same output of the shift register B 205a of the t5 time period to descramble the F-PDCCH having a length of two slots received in the time period of the slot2 and the slot3.

Also, the MS uses the same output of the shift register B 205a of the t9 time period to descramble the F-PDCCH having a length of four slots received in the time period of the slot2 to the slot5.

In the same manner, the MS uses the same output of the shift register B 205a of the t7 time period to descramble the F-PDCCH having a length of one slot received in the time period of the slot4.

That is, if the MS uses CommonMask(i), the output of the second register 205a that the BS generates by Mask(i,N) at a specified time will be the output values of the second register 205b to be generated after an N-slot time from the specified time.

As a result, in order to correctly descramble the received F-PDCCH after the N-slot time length, the MS can use CommonMask(i).

That is, as shown in FIG. 10B, the F-PDCCH of a two-slot length, which the BS scrambled using the sequence of the shift register B 205a of the t1 time period, is descrambled by the output of the shift register B 205b of the t5 period that is after the two-slot time length.

Table 3 shows an example of the long code masks composed of 42 bits for the system operating in the second embodiment of the present invention. At this time, it is assumed that CommonMask(i) has the same value with respect to all i.

TABLE 3

| Long Code Mask Types | MSB . . . LSB |
|---|---|
| CommonMask(i) | 110001100110110000000000000000000000000000 |
| Mask(i,1) | 001100110110110011000010011000001001010000 |
| Mask(i,2) | 000110000110101011000110000110011000100101 |
| Mask(i,4) | 010110010100111011110000111101100100000011 |

Figure 10C:
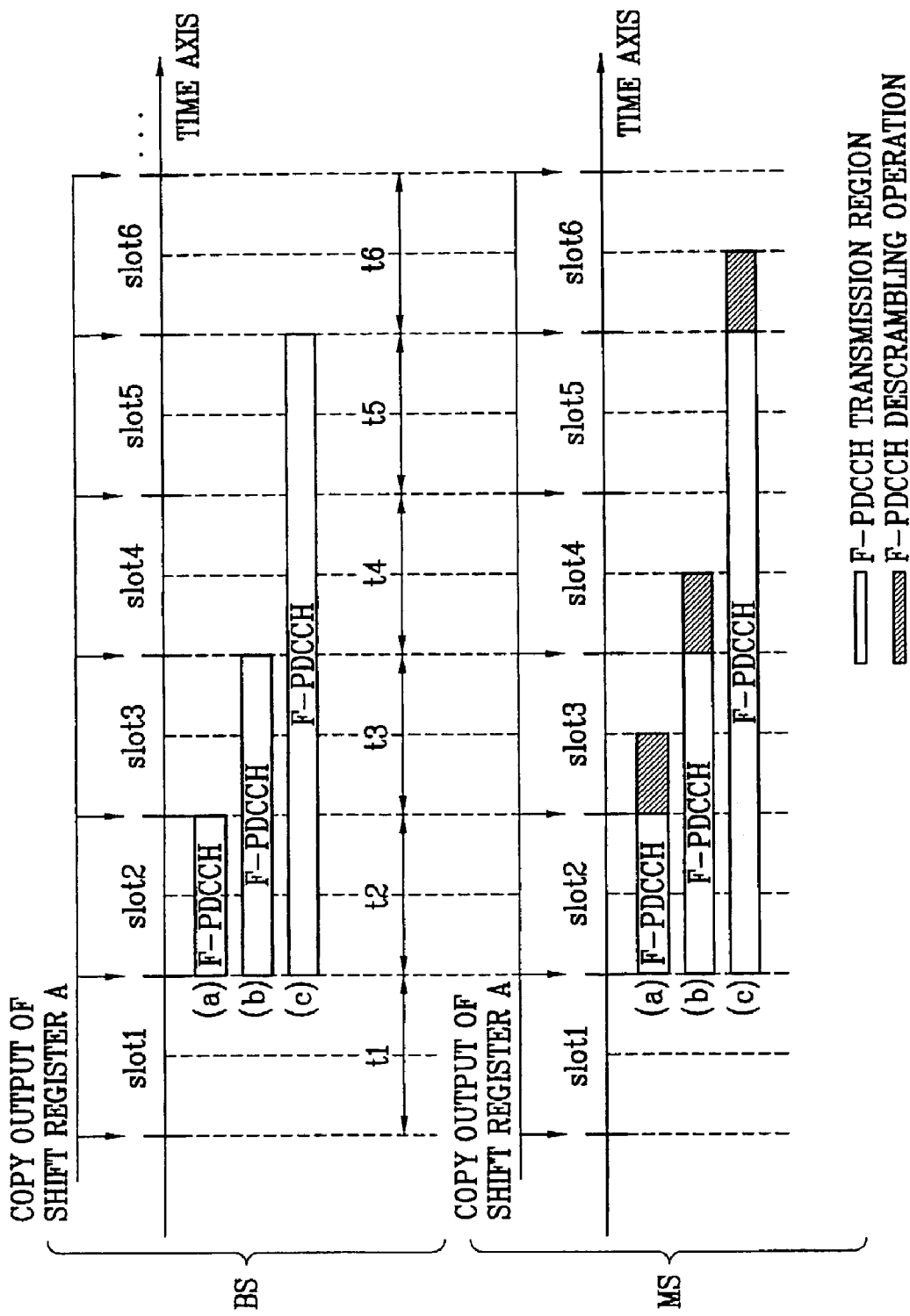

FIG. 10C exemplifies the case that the switch 204a between Z4 and Z5 of the BS is used to copy the output of the 21-bit shift register 203a into the 21-bit shift register 205a at a start time point of one slot. It is assumed that Δ=1, and no transmission delay occurs between the BS and the MS.

First, if the BS transmits the F-PDCCH having a transmission length of one, two, or four slots at the start time point of the slot2, the one or more slots are scrambled using the output of the shift register B 205a of the t1 time period.

In the same manner, if the BS transmits the F-PDCCH having a transmission length of one, two, or four slots at the start time point of the slot5, the one or more slots are scrambled using the output of the shift register B 205a of the t4 time period. The long code mask used at this time is Mask(i,N).

The MS uses the output of the shift register B 205b of the t3 time period to descramble the F-PDCCH having a length of one slot received in the time period of the slot2.

Also, the MS uses the output of the shift register B 205b of the t4 time period to descramble the F-PDCCH having a length of two slots received in the time period of the slot2 and the slot3.

Also, the MS uses the output of the shift register B 205b of the t6 time period to descramble the F-PDCCH having a length of four slots received in the time period of the slot2 to the slot5.

In the same manner, the MS uses the output of the shift register B 205b of the t3 time period to descramble the F-PDCCH having a length of one slot received in the time period of the slot4.

That is, if the MS uses CommonMask(i), the output of the second register 205a that the BS generates by Mask(i,N) at a specified time will be the output values of the second register 205b to be generated after an (N+1)-slot time from the specified time.

As a result, in order to descramble the received F-PDCCH after the N-slot time length, the MS may use CommonMask(i).

For example, as shown in FIG. 10C, the F-PDCCH of a two-slot length, which the BS scrambled using the output of the shift register B 205a of the t1 time period, is descrambled by the output of the shift register B 205b of the t3 period that is after the three-slot time length.

Table 4 shows another example of the long code masks composed of 42 bits for the system operating as in the second embodiment of the present invention. At this time, it is assumed that CommonMask(i) has the same value with respect to all i.

TABLE 4

| Long Code Mask Types | MSB . . . LSB |
|---|---|
| CommonMask(i) | 110001100110110000000000000000000000000000 |
| Mask(i,1) | 000110000110101011000110000110011000100101 |
| Mask(i,2) | 100000100011100001111111001011111111001110 |
| Mask(i,4) | 101000011111100101010011001010011111011010 |

Figure 10D:
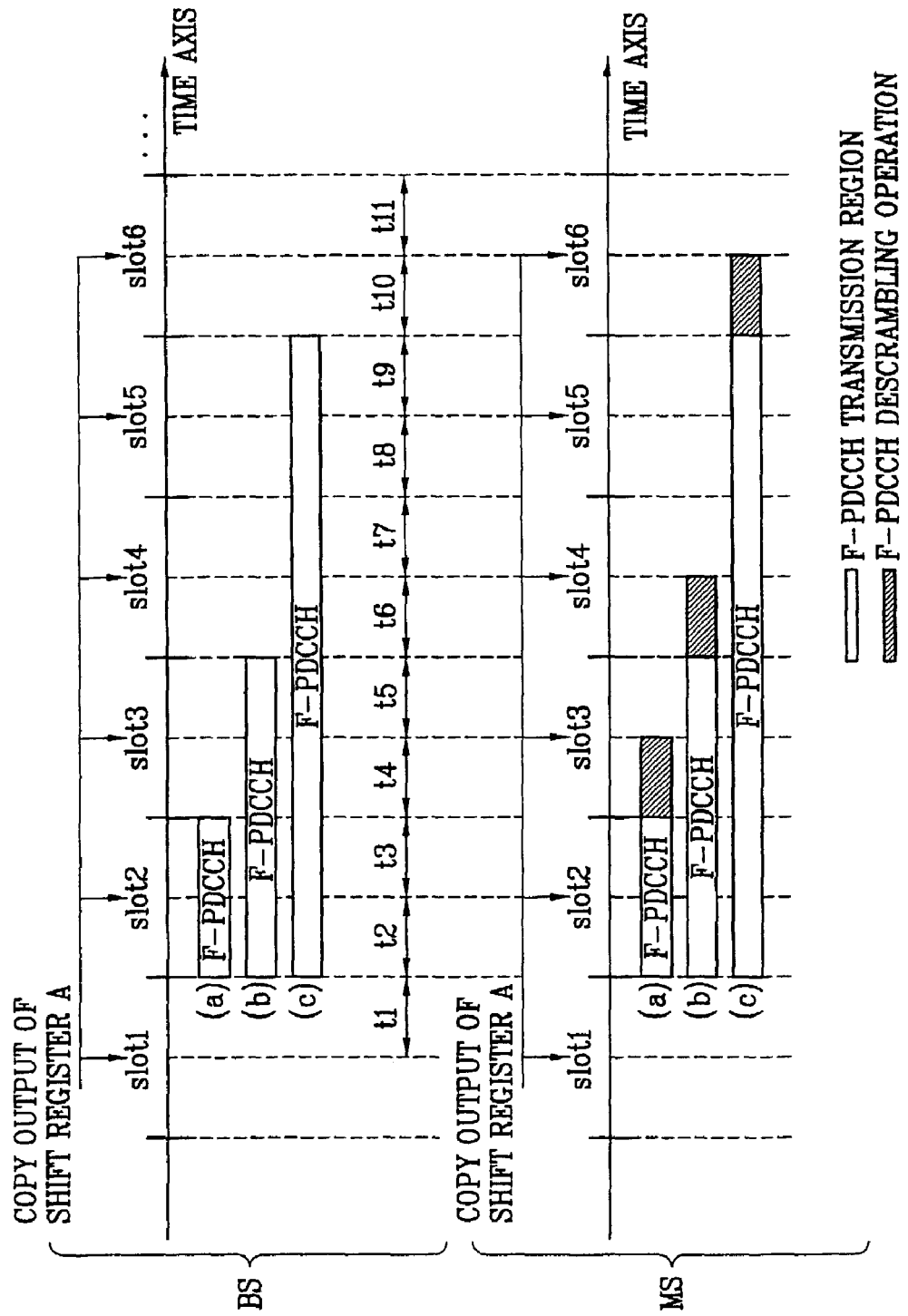

In FIG. 10D, it is not necessarily required for the operational time points of the switch 204a and 204b between Z4 and Z5 of the BS and the MS to coincide with each other. FIG. 10D exemplifies the case that the switch 203a between Z4 and Z5 of the BS is used to copy the output of the 21-bit shift register A 203a into the 21-bit shift register 205a at a specified center time point within one slot, and the switch 204b between Z4 and Z5 of the MS is used to copy the output of the 21-bit shift register A 203b into the 21-bit shift register 205b at the start time point of one slot. It is assumed that Δ=0.5, and no transmission delay occurs between the BS and the MS.

First, if the BS transmits the F-PDCCH having a transmission length of one, two, or four slots at the start time point of the slot2, the one or more slots are scrambled using the output of the shift register B 205a of the t1 time period. In the same manner, if the BS transmits the F-PDCCH having a transmission length of one, two, or four slots at the start time point of the slot5, the one or more slots are scrambled using the output of the shift register B of the t7 time period. The long code mask used at this time is Mask(i,N).

The MS uses the output of the shift register B 205b of the t4 time period to descramble the F-PDCCH having a length of one slot received in the time period of the slot2.

Also, the MS uses the output of the shift register B 205*b* of the t6 time period to descramble the F-PDCCH having a length of two slots received in the time period of the slot2 and the slot3.

Also, the MS uses the output of the shift register B 205*b* of the t10 time period to descramble the F-PDCCH having a length of four slots received in the time period of the slot2 to the slot5.

Also, the MS uses the output of the shift register B 205*b* of the t8 time period to descramble the F-PDCCH having a length of one slot received in the time period of the slot4.

That is, if the MS uses CommonMask(i), the output of the second register 205*a* that the BS generates by Mask(i,N) at a specified time will be the output values of the second register 205*b* to be generated after an (N+0.5)-slot time from the specified time. As a result, in order to descramble the received F-PDCCH after the N-slot time length, the MS can use CommonMask(i).

For example, as shown in FIG. 10D, the F-PDCCH of a two-slot length, which the BS scrambled using the output of the shift register B 205*a* of the t1 time period, is descrambled by the output of the shift register B 205*b* of the t6 period that is after the 2.5-slot time length.

Table 5 shows another example of the long code masks composed of 42 bits for the system operating as in the second embodiment of the present invention. At this time, it is assumed that CommonMask(i) has the same value with respect to all i.

TABLE 5

| Long Code Mask Types | MSB ... LSB |
| --- | --- |
| CommonMask(i) | 110001100110110000000000000000000000000000 |
| Mask(i,1) | 101011111011111010011010000110101010000100 |
| Mask(i,2) | 111011101100101101011101010101100001011111 |
| Mask(i,4) | 101001010000000100000001011011110110000010 |

As described above, according to the present invention, since the transmitting end scrambles the transmission format of a physical channel of a variable length and the receiving end accurately detects the transmission format, the waste of resources can be reduced, and thus the whole performance of the system can be improved.

Also, if the scrambler/descrambler is designed according to the present invention, the time delay of the scrambler/descrambler between the transmitter and the receiver can be considered. Thus, it is not required for the receiving end (i.e., MS) to store the descrambling code for several slot lengths in order to compensate for the time delay, and thus the hardware complexity can be reduced.

It will be apparent to one skilled in the art that the preferred embodiments of the present invention can be readily implemented using, for example, a suitably programmed digital signal processor (DSP) or other data processing device, either alone or in combination with external support logic. The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium, volatile and non-volatile memory devices (e.g., EEPROMs, ROMs, PROMs, RAMs, DRAMs, SRAMs, firmware, programmable logic, etc.). Code in the computer readable medium is accessed and executed by a processor. Of course, those skilled in the art will recognize that many modifications may be made to this configuration without departing from the scope of the present invention, and that the article of manufacture may comprise any information bearing medium known in the art.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A wireless communication method using a communication channel capable of transferring packet control data having variable slot lengths, the method comprising:
scrambling the packet control data with a scrambling sequence in a scrambler located in a physical layer, wherein the scrambling sequence is generated using data related to a number of slots and system time, wherein the system time is in units of a first slot of a physical layer forward packet data control channel (F-PDCCH) transmission, wherein the number of slots is either one, two, or four slots, and wherein the scrambling sequence is equal to 13 least significant bits of the sum of the number of slots and the system time; and
transmitting the scrambled packet control data to a receiver via the F-PDCCH.

2. The wireless communication method of claim 1, further comprising:
descrambling the scrambled packet control data using a descrambling sequence that is independent of the number of slots in a descrambler of the receiver.

3. The wireless communication method of claim 2, wherein the scrambling and descrambling steps are performed so that the scrambling sequence used at a first time point for scrambling the packet control data is equal to the descrambling sequence used at a second time point for descrambling the scrambled packet control data.

4. The wireless communication method of claim 3, wherein with respect to a slot length N for transmitting the packet control data and a predetermined constant Δ, the descrambling sequence generated from the descrambler after N+Δ from the first time point when the packet control data is scrambled is equal to the scrambling sequence generated at the first time point when the packet control data is scrambled.

5. The wireless communication system of claim 4, wherein Δ is one of 0, 0.5 and 1.

6. The wireless communication method of claim 3, wherein the scrambling sequence is generated by using output bits of the scrambler and the number of slots of the packet control data and the descrambling sequence is output bits of the descrambler, where the output bits of the scrambler to scramble the packet control data are identical to the output bits of the descrambler to descramble the packet control data.

7. The wireless communication method of claim 6, wherein with respect to a slot length N for transmitting the packet control data and a predetermined constant Δ, the scrambling sequence is the output bits of the scrambler based on the slot N and the predetermined constant Δ.

8. The wireless communication method of claim 7, wherein the scrambler and the descrambler each comprises a timer.

9. The wireless communication system of claim 8, wherein Δ is one of 0, 0.5 and 1.

10. The wireless communication method of claim 1, wherein the scrambling sequence is generated in response to different long code masks based on the slot length.

11. The wireless communication method of claim 1, further comprising the steps of:
adding an error detection code to the packet control data;
adding tail bits to the packet control data having the error detection code;
encoding the packet control data with the tail bits added thereto;
performing at least one of symbol repetition and puncturing the coded packet control data to match a length of a transmission slot;
interleaving the symbol-repeated or punctured data; and
modulating the interleaved data,
wherein the step of scrambling is performed after any one of the above steps.

12. The wireless communication method of claim 1, further comprising the steps of:
scrambling the packet control data;
adding a first error detection code to the scrambled packet control data using a medium access control identifier (MAC ID) provided as an identifier of the receiver to which the packet control data is to be transmitted; and
adding a second error detection code using the scrambled packet control data to which the first error detection code is added.

13. A wireless communication method using a communication channel capable of transferring packet control data having variable slot length, the method comprising:
receiving a scrambled packet control data, wherein the packet control data is scrambled with a scrambling sequence that is generated using data related to a number of slots and system time, wherein the system time is in units of a first slot of a physical layer forward packet data control channel (F-PDCCH) transmission, wherein the number of slots is either one, two, or four slots, and wherein the scrambling sequence is equal to 13 least significant bits of the sum of the number of slots and the system time; and
descrambling the scrambled packet control data by using a descrambling sequence, wherein the descrambling sequence is generated based on a receiving time, wherein the transmission time of the F-PDCCH transmission and the receiving time is responsive to the system time.

14. A wireless communication system using a communication channel capable of transferring packet control data having variable slot length, the system comprising:
a scrambler located in a physical layer for scrambling the packet control data with a scrambling sequence, wherein the scrambling sequence is generated using data related to a number of slots and system time, wherein the system time is in units of a first slot of a physical layer forward packet data control channel (F-PDCCH) transmission, wherein the number of slots is either one, two, or four slots, and wherein the scrambling sequence is equal to 13 least significant bits of the sum of the number of slots and the system time; and
a transmitter portion for transmitting the scrambled packet control data to a receiver via the F-PDCCH.

15. The wireless communication system of claim 14, further comprising a descrambler for descrambling the packet control data using a descrambling sequence that is independent of the slot length.

16. The wireless communication system of claim 14, wherein the scrambling sequence is generated in response to different long code masks based on the number of slots.

17. The wireless communication system of claim 14, further comprising:
an error detection code addition module for adding an error detection code to the packet control data;
a tail bit addition module for adding tail bits to the packet control data having the error detection code;
an encoder for encoding the packet control data with the tail bits added thereto;
a symbol repetition module for performing at least one of a symbol repetition;
a puncturing module for puncturing the coded packet control data to match a length of a transmission slot;
an interleaver for interleaving the symbol-repeated or punctured data; and
a modulator modulating the interleaved data,
wherein a scrambler is disposed after any one of the above modules.

18. The wireless communication system of claim 14, further comprises:
a first error detection code module for adding a first error detection code to the scrambled packet control data using a medium access control identifier (MAC ID) provided as an identifier of the receiver to which the packet control data is to be transmitted; and
a second error detection code module for adding a second error detection code using the scrambled packet control data to which the first error detection code is added.

19. The wireless communication system of claim 14, wherein the scrambling sequence used at a first time point for scrambling the packet control data is equal to the descrambling sequence used at a second time point for descrambling the scrambled packet control data.

20. The wireless communication system of claim 19, wherein with respect to a slot length N for transmitting the packet control data and a predetermined constant $\Delta$, the descrambling sequence generated from the descrambler after $N+\Delta$ from the first time point when the data is scrambled is equal to the scrambling sequence generated at the time point when the data is scrambled.

21. The wireless communication system of claim 20, wherein $\Delta$ is one of 0, 0.5 and 1.

22. A wireless communication method using a communication channel capable of transferring packet data having variable slot lengths, the method comprising:
scrambling the packet control data with a scrambling sequence in a scrambler located in a physical layer, wherein the scrambling sequence used at a first time point for scrambling the packet data is equal to a descrambling sequence used at a second time point for descrambling the scrambled packet data, wherein the scrambling sequence is generated using data related to a number of slots and system time, wherein the system time is in units of a first slot of a physical layer forward packet data control channel (F-PDCCH) transmission, wherein the number of slots is either one, two, or four slots, and wherein the scrambling sequence is equal to 13 least significant bits of the sum of the number of slots and the system time; and
transmitting the scrambled packet control data to a receiver via the F-PDCCH.

23. A wireless communication system for receiving a communication channel capable of transferring packet data having variable slot lengths, the receiver comprising:

a receiver for receiving a scrambled packet data receiver via a physical layer forward packet data control channel (F-PDCCH transmission), wherein the packet data is scrambled with a scrambling sequence that is generated using data related to a number of slots and system time, wherein the system time is in units of a first slot of the F-PDCCH, wherein the number of slots is either one, two, or four slots, and wherein the scrambling sequence is equal to 13 least significant bits of the sum of the number of slots and the system time; and a descrambler located in a physical layer for descrambling the scrambled packet data by using a descrambling sequence, wherein the descrambling sequence is generated based on a receiving time, wherein the transmission time of the F-PDCCH transmission and the receiving time is responsive to the system time.

24. A mobile terminal for use with a wireless transmission system using communication channels capable of transferring packet data having variable slot lengths, the communication system comprising a scrambler for scrambling the packet data with at least one of the plurality of code masks, wherein the packet data having different slot lengths are scrambled with scrambling codes generated using different code masks, the terminal comprising:

a descrambler that descrambles the scrambled packet data using a common code mask that is used to generate the plurality of code masks used in the transmission system, wherein with respect to a slot length N for transmitting the packet data and a predetermined constant Δ, the scrambling code mask generated from the common code mask comprises the code mask after N+Δ from a time point when the data is scrambled, wherein the common code mask comprises 1100011001101100000000000000000000000000.

25. The mobile terminal of claim 24, further comprising:

a long code generator operable in response to the common code mask to generate long codes;

a bit extractor operably connected to the long code generator;

a first shift register operably connected to the bit extractor;

a switch operably connected to the first shift register to control an output signal of the first shift register; and a second shift register operably connected to the switch.

\* \* \* \* \*